United States Patent [19]

Diebel

[11] 4,320,025
[45] Mar. 16, 1982

[54] CAVITATION-INHIBITING, NONFREEZING, COOLING AND/OR HEAT TRANSFER FLUIDS

[75] Inventor: Klaus Diebel, Marl, Fed. Rep. of Germany

[73] Assignee: Chemische Werke Huels Aktiengesellschaft, Marl, Fed. Rep. of Germany

[21] Appl. No.: 198,378

[22] Filed: Oct. 20, 1980

[30] Foreign Application Priority Data

Oct. 24, 1979 [DE] Fed. Rep. of Germany ....... 2942864

[51] Int. Cl.³ .......................... C09K 5/00; C23F 11/10
[52] U.S. Cl. ..................................... 252/78.5; 252/75; 252/76; 252/79
[58] Field of Search ....................... 252/71, 75, 76, 77, 252/78.5, 79, 389 A, 392

[56] References Cited

U.S. PATENT DOCUMENTS 3,357,924 12/1967 Molinet et al. ...................... 252/171
3,607,757 9/1971 McDonald ............................ 252/75
4,052,160 10/1977 Cook et al. ....................... 252/389 A

FOREIGN PATENT DOCUMENTS 942489 2/1974 Canada .
2505435 8/1976 Fed. Rep. of Germany .
51-6831 1/1976 Japan .

Primary Examiner—P. E. Willis, Jr.
Attorney, Agent, or Firm—Millen & White

[57] ABSTRACT

A cavitation-inhibiting, nonfreezing, cooling and/or heat-transfer liquid comprises a glycol and a cavitation-inhibiting effective amount of at least one phosphonocarboxylic acid of the formula

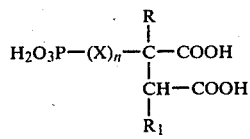

wherein
R is H or $C_{1-6}$ alkyl, the latter optionally substituted by carboxy,
$R_1$ is H or $C_{1-3}$ alkyl, the latter optionally substituted by carboxy,
X is $C_{1-3}$ alkylene optionally substituted by COOH or $PO_3H_2$ groups, and
n is 0 or 1.

8 Claims, No Drawings

CAVITATION-INHIBITING, NONFREEZING, COOLING AND/OR HEAT TRANSFER FLUIDS

BACKGROUND OF THE INVENTION

The metallic materials of industrial cooling and/or heat-transfer systems are subject to more or less strong chemical and mechanical stresses when used with aqueous, glycol-containing media. Damage to the material, i.e., corrosion and cavitation results. The degree of damage depends on the quality of the metals, the nature of the cooling or heat-transfer fluid, and on the external conditions of the cooling cycle. The damage to the material can be effectively combated and reduced by addition of suitable inhibitors to the functional fluids, but can be prevented entirely only in the rarest cases.

Preferred corrosion-protecting agents are benzoates, borax, nitriles, and occasionally, phosphates. The effect of such inhibitors is specific and usually is restricted to one metal group when used within a limited concentration range. As the metals are exposed to increased stress, for example due to cavitation, the inhibitors may in certain cases again lose their beneficial protective effect and cause increased damage to the materials. The damage to certain metals, for example, aluminum, can in this connection, definitely be worse than that which would otherwise occur had there been no inhibitor added at all.

Cavitation damage can be observed, due to conditions of construction, primarily on components made of cast iron and aluminum, e.g., on materials normally used in pumps. Such damage occurs predominantly in cooling systems for internal combustion engines. In addition to the water pump, endangered are the cylinder liners, parts of the crankcase, radiators and others. Accordingly, cast iron and aluminum, together with its alloys, are to be protected principally against cavitation. The conventional corrosion-protecting additives are suitable for this purpose only in exceptional cases.

In water, borate-nitrite mixtures show a cavitation-inhibiting effect with respect to gray cast iron. However, in glycol-water mixtures, this inhibitor combination results in increased erosion of aluminum. Also, corrosion inhibition with sodium benzoate and sodium nitrite or sodium nitrate permits unduly high cavitation erosions on aluminum and aluminum alloys. Both formulations moreover, are sensitive to certain chemicals, such as, for example, sodium carbonate, which are frequently utilized to set a minimum alkalinity of the coolants and to protect against superacidification.

Cavitation-inhibiting cooling liquids for diesel engines are known from DAS's [German Published Applications] 1,239,137 and 1,263,398. They contain polyalkylene glycols or polyoxyethylates of alcohols, carboxylic acids or carboxylic acid amides. Also, cavitation-inhibiting cooling fluids for internal combustion engines are known from DAS No. 1,239,138. These contain polyvinylpyrrolidone.

These prior-art additives are effective, however, only on gray cast iron, and even in this case, only when used in comparatively high concentrations (0.1–5% by weight). These additives are practically ineffective with respect to aluminum, as will be demonstrated below by comparative tests (Tables 1 and 2). This, of course, is especially disadvantageous in that a prime objective is to improve cavitation protection and corrosion protection with respect to aluminum and aluminum alloys in view of the increased usage of these light metals in engine construction.

SUMMARY OF THE INVENTION

Accordingly, it is an object of this invention to provide cavitation-inhibiting cooling and/or heat-transfer liquids free of the aforementioned disadvantages and which are useful with respect to aluminum-type materials.

Upon further study of the specification and appended claims, further objects and advantages of this invention will become apparent to those skilled in the art.

These objects have been attained, in one respect, by providing cooling and/or heat-transfer liquids comprising a glycol and 0.005–0.2% by weight, based on the weight of glycol, of at least one phosphonocarboxylic acid of the general formula

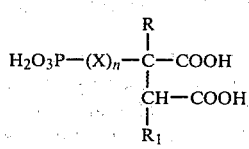

wherein

R is H or $C_{1-6}$ alkyl, the latter optionally substituted by one or more substituents, for example by carboxy groups, $R_1$ is H or $C_{1-3}$ alkyl, the latter optionally substituted by one or more carboxy groups, X is $C_{1-3}$alkylene, optionally substituted by COOH or $PO_3H_2$ groups, and n is 0 or 1.

These solutions generally are based on glycols in water and contain a conventional corrosion inhibitor.

DETAILED DISCUSSION

The cavitation-inhibiting cooling liquids of this invention preferably contain 0.01–0.06% by weight of the phosphonocarboxylic acids. The phosphonocarboxylic acids demonstrate optimum protective effects even at concentrations below 0.05% by weight based on the glycol proportion of the liquids, which is an unusually low effective concentration for inhibitors.

The preferred number of substituents for the R alkyl groups is 1–2; for the $R_1$ alkyl group is 1; and for the X alkylene group is 1.

Examples of suitable phosphonocarboxylic acids which can be used in the cavitation-inhibiting, cooling and heat-transfer liquids of this invention include phosphonosuccinic acid, 2-phosphonopropanedicarboxylic acid, 2-phosphonobutanedicarboxylic acid, 2-phosphonopentanedicarboxylic acid, 2-phosphonobutane-1,2,4-tricarboxylic acid, 2-phosphonobutane-2,3,4-tricarboxylic acid, 1-phosphonopropanedicarboxylic acid, 1-phosphonobutane-1,2,4-tricarboxylic acid, 1-phosphonobutane-1,3,4-tricarboxylic acid, 1-phosphonobutane-2,3,4-tricarboxylic acid, 1-phosphonopropanetricarboxylic acid, 1,1-diphosphonopropanedicarboxylic acid, 2,2-diphosphonobutanedicarboxylic acid, etc.

In a preferred embodiment of this invention, the cavitation-inhibiting cooling liquids contain 2-phosphonobutane-1,2,4-tricarboxylic acid as the phosphonocarboxylic acid.

These compounds can be prepared according to generally known methods, inter alia, in accordance with the processes disclosed in DAS's Nos. 2,015,068; 2,061,838; and 2,217,692, whose disclosures are incorporated by reference herein.

Suitable glycols for use in the glycol-water mixtures include above all, ethylene glycol and propylene glycol. Moreover, it is also possible to use other glycols, e.g., diethylene or dipropylene glycol. The glycols can be used individually or in mixtures. They are usually employed in the normal concentrations of 10–60% by weight, based on the total weight of the water and the glycol components.

The corrosion inhibitors (protective agents) which can be employed include the conventional and popular compounds such as sodium benzoate, borax, sodium nitrite, sodium phosphates, sodium carbonate, sodium nitrate, sodium silicate, as well as organic nitrogen or sulfur compounds in combinations customary for such compounds. The conventional quantities of these agents can be employed, e.g., generally 2–5 wt%, based on the amount of glycol.

As demonstrated by the following examples, the cooling liquids of this invention generally effect a reduction in cavitation of 25–70%. The additives of this invention provide marked, cavitation-inhibiting effects of 25% to 70% in all commercially available products used for a great variety of special purposes; in other words, the phosphonocarboxylic acids, in very low concentrations, improve the resistance to cavitation erosion of already good formulations and reduce the degree of erosion caused by presently used inferior formulations to values of a good formulation.

The cooling or heat-transfer liquids of this invention, in addition to the strongly cavitation-inhibiting effect, also provide protection against solid formation on the heat-transfer walls. Moreover, they provide increased corrosion protection for the metallic materials utilized in cooling systems. Both effects are shown in the following Tables 4 and 5.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The determination of the amounts eroded by cavitation was made according to the guidelines of the standardized testing method per "Forschungsvereinigung fuer Verbrennungskraftmaschinen e.V." [Research Association for Internal Combustion Engines] (leaflet R 315, 1977), using an ultrasonic vibrator. The testing material was the solution-annealed, cold-hardened aluminum alloy, AlCuMg$_2$.

TABLE 1

| Cavitation Test: Formulation | Frequency Vibration Amplitude Testing Temperature | | | | | 20 kHz 20 μm 80° C. | | Test Specimen Water Hardness | | | AlCuMg2 10° dGH | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Phosphonobutane-tricarboxylic acid % | — | 0.01 | 0.05 | — | — | 0.01 | — | 0.01 | — | 0.01 | — | 0.01 | 0.01 | 0.01 |
| Sodium benzoate % | — | — | — | — | — | — | — | — | 2.5 | 2.5 | 2.5 | 2.5 | 2.5 | 2.5 |
| Borax % | 2 | 2 | 2 | 2 | 2 | 2 | 2 | 2 | 2 | 2 | 2 | 2 | 2 | 2 |
| Sodium nitrite % | — | — | — | 0.3 | 0.3 | 0.3 | 0.3 | 0.3 | 0.2 | 0.2 | — | — | — | — |
| Sodium nitrate % | — | — | — | — | — | — | — | — | — | — | 0.3 | 0.3 | 0.3 | 0.3 |
| Sodium carbonate % | — | — | — | — | — | — | 0.4 | 0.4 | — | — | — | — | — | 0.1 |
| Sodium silicate % | — | — | — | — | — | — | — | — | — | — | — | — | — | — |
| Nonferrous metal protection % | — | — | — | — | — | — | — | — | — | — | — | — | 0.15 | 0.15 |
| Polyethylene glycol 1000% | — | — | — | — | 1 | — | — | — | — | — | — | — | — | — |
| Polypropylene glycol 1000% | — | — | — | — | — | — | — | — | — | — | — | — | — | — |
| Test Result 20% Aqueous solution** | | | | | | | | | | | | | | |
| Amount eroded (mg/h) | 22 | 13 | 12 | 24 | 26 | 12 | 46 | 16 | 26 | 9.5 | 27 | 12 | 13 | 15 |
| Test specimen* | d | h | h | d | d | h | s | l | s | h | d | h | h | h |
| 10% Aqueous solution** | | | | | | | | | | | | | | |
| Amount eroded (mg/h) | 46 | 17 | 11 | | | | | | 51 | 21 | | | | |
| Test specimen* | s | l | h | | | | | | s | l | | | | |

*The visual finding of the test specimens was evaluated by the following scale:
h = bright-colored, no change in coloration
l = slight tarnish spots
d = dark tarnish
s = black
**of inhibited ethylene glycol.

TABLE 2

| Cavitation Test: Formulation | Frequency Vibration Amplitude Testing Temperature | | | 20 kHz 20 μm 80° C. | | Test Specimen Water Hardness | | | AlCuMg2 10°dGH | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Phosphonobutane-tricarboxylic acid % | — | 0.01 | — | — | — | 0.01 | — | 0.01 | 0.05 | 0.01 | 0.05 | — | 0.01 | 0.05 |
| Sodium benzoate % | 2.5 | 2.5 | 2.5 | 2.5 | 2.5 | 2.5 | 2.5 | 2.5 | 2.5 | 5 | 5 | 2.5 | 2.5 | 2.5 |
| Borax % | — | — | — | — | — | — | — | — | — | — | — | 2 | 2 | 2 |
| Sodium nitrite % | 0.3 | 0.3 | 0.3 | 0.3 | — | — | 0.2 | 0.2 | 0.2 | 0.5 | 0.5 | — | — | — |
| Sodium nitrate % | — | — | — | — | 0.3 | 0.3 | — | — | — | — | — | 0.3 | 0.3 | 0.3 |
| Sodium carbonate % | 0.4 | 0.4 | 0.4 | 0.4 | 0.4 | 0.4 | — | — | — | — | — | — | — | — |
| Sodium silicate % | — | — | — | — | — | — | — | — | — | — | — | 0.1 | 0.1 | 0.1 |
| Nonferrous metal protection % | — | — | — | — | — | — | — | — | — | — | — | 0.1 | 0.1 | 0.1 |

TABLE 2-continued

| Cavitation Test: | Frequency | 20 kHz | Test Specimen | AlCuMg2 | | | | | | | | | | |
|---|---|---|---|---|---|---|---|---|---|---|---|---|---|---|
| | Vibration Amplitude | 20 μm | Water Hardness | 10°dGH | | | | | | | | | | |
| | Testing Temperature | 80° C. | | | | | | | | | | | | |
| Formulation | 15 | 16 | 17 | 18 | 19 | 20 | 21 | 22 | 23 | 24 | 25 | 26 | 27 | 28 |
| Polyethylene glycol 1000% | — | — | 1 | — | 1 | — | — | — | — | — | — | — | — | — |
| Polypropylene glycol 1000% | — | — | — | 1 | — | — | — | — | — | — | — | — | — | — |
| Test Result | | | | | | | | | | | | | | |
| 20% Aqueous solution** | | | | | | | | | | | | | | |
| Amount eroded (mg/h) | 106 | 47 | 166 | 125 | 132 | 44 | 19 | 12 | 11 | 10 | 10.5 | 9.5 | 6.5 | 6 |
| Test specimen* | s | l | s | s | s | l | d | h | h | h | h | d | h | h |
| 10% Aqueous solution** | | | | | | | | | | | | | | |
| Amount eroded (mg/h) | | | | | | | 12 | 10 | 8 | | | 11 | 7 | 7 |
| Test speciment* | | | | | | | d | h | h | | | d | h | h |

*The visual finding of the test specimens was evaluated by the following scale:
h = bright-colored, no change in coloration
l = slight tarnish spots
d = dark tarnish
s = black
**of inhibited ethylene glycol.

TABLE 3

| Cavitation Test: | Frequency | 20 kHz | | | |
|---|---|---|---|---|---|
| | Vibrating Amplitude | 20 μm | | | |
| | Testing Temperature | 80° C. | | | |
| | Test Specimen | AlCuMg2 | | | |
| | Water Hardness | 10° dGH | | | |
| Formulation | | 29 | 30 | 31 | 32 |
| Phosphonobutanetricarboxylic acid % | | — | 0.01 | — | 0.01 |
| Sodium benzoate % | | 2.5 | 2.5 | 2.5 | 2.5 |
| Borax % | | 2 | 2 | 1 | 1 |
| Sodium nitrite % | | 0.2 | 0.2 | 0.2 | 0.2 |
| Sodium nitrate % | | 0.2 | 0.2 | 0.2 | 0.2 |
| Sodium carbonate % | | — | — | — | — |
| Sodium silicate % | | 0.05 | 0.05 | 0.05 | 0.05 |
| Nonferrous metal protection % | | 0.1 | 0.1 | 0.1 | 0.1 |
| Test Result | | | | | |
| 20% Aqueous solution** | | | | | |
| Amount eroded (mg/h) | | 14 | 10.5 | 13.5 | 11 |
| Test specimen* | | d | h | d | l |

*The visual finding of the test specimens was evaluated by the following scale:
h = bright-colored, no change in coloration
l = slight tarnish spots
d = dark tarnish
s = black
**of inhibited ethylene glycol.

TABLE 4

Solids Formation on the Heating Rods with the Use of Various Antifreeze Glycols

| Recipe | Anti-freeze Glycol | Phosphono-butane tricarboxylic Acid (Bulk-%) | Water Hardness (° dGH) | Finding on Heating Rods |
|---|---|---|---|---|
| 1 | I | — | 10 | Thick, firmly adhering grey coat |
| 2 | I | 0.005 | 20 | Light-grey, thin coat |
| 3 | I | 0.01 | 10 | Thin, coherent coat |
| 4 | II | — | 10 | Thick, grey coat |
| 5 | II | 0.005 | 10 | Slight coat formation |
| 6 | III | — | 10 | Thick, firmly adhering coat |
| 7 | III | 0.005 | 10 | Minor coat formation |
| 8 | III | 0.01 | 10 | Insignificant coat formation |
| 9 | IV | — | 10 | Thick, firm coat |
| 10 | IV | 0.01 | 10 | Minor coat formation at scattered locations |

Recipes of the Antifreeze Glycols:

| I | 2.5% sodium benzoate | III | 2.5% sodium benzoate |
|---|---|---|---|
| | 1.4% borax | | 1.4% borax |
| | 0.2% sodium nitrite | | 0.3% sodium nitrite |
| | 0.1% sodium nitrate | | 0.05% sodium nitrate |
| | 0.1% nonferrous metal protection | | 0.1% nonferrous metal protection |
| II | 2.5% sodium benzoate | IV | 2.5% sodium benzoate |
| | 1.4% borax | | 2% borax |
| | 0.2% sodium nitrite | | 0.4% sodium nitrate |
| | 0.2% sodium nitrate | | 0.1% sodium carbonate |
| | 0.05% sodium silicate | | 0.1% sodium silicate |
| | 0.1% nonferrous metal protection | | 0.1% nonferrous metal protection. |

TABLE 5

Corrosion Test According to FVV 315 (1977) with Antifreeze Glycols I-IV, Amounts Eroded Indicated in mg/Plate

| Metals | Recipes | | | | | | | | | |
|---|---|---|---|---|---|---|---|---|---|---|
| | 1 | 2 | 3 | 4 | 5 | 6 | 7 | 8 | 9 | 10 |
| Copper | 4.1 | 2.3 | 0.5 | 1.1 | 1.5 | 3.3 | 1.5 | 1.8 | 1.0 | 1.0 |
| Brass | 3.9 | 3.2 | 2.7 | 2.5 | 2.1 | 3.5 | 2.9 | 2.0 | 4.3 | 1.9 |
| Solder (on Brass) | 5.2 | 5.0 | 0.1 | 1.9 | 1.7 | 4.5 | 2.0 | 1.7 | 1.3 | 1.0 |
| Steel | 6.7 | 0.0 | 1.3 | 0.4 | 0.8 | 1.0 | 1.5 | 0.0 | 1.4 | 0.8 |
| Grey Cast Iron | 5.5 | 1.0 | 3.6 | 2.5 | 2.0 | 2.1 | 2.5 | 1.5 | 9.8 | 5.2 |
| AlCuMg$^2$ | 180 | 145 | 13 | 15 | 7.0 | 33 | 14 | 12 | 1.5 | 0.4 |
| G-AlSi$_{10}$Mg-wa$^{(*)}$ | 194 | 146 | 14 | 18 | 14 | 26 | 15 | 8.5 | 2.0 | 0.9 |

$^{(*)}$wa means hardened at elevated temperatures

The surfaces of all metal sheets were bright and smooth for specimens 3, 5, 7, 8, 9 and 10 after cleaning, and showed no corrosion spots at all (no pitting); only in the case of the gray cast metal, crevice corrosion was observed to a certain extent, i.e., attack was observed at the joints of the intermediate steel rings.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A cavitation-inhibiting, nonfreezing, cooling and-/or heat-transfer liquid comprising water, a glycol, a cavitation-inhibiting effective amount of at least one phosphonocarboxylic acid of the formula

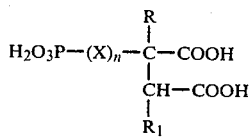

wherein
R is H, $C_{1-6}$ alkyl, or $C_{1-6}$ alkyl substituted by carboxy,
$R_1$ is $C_{1-3}$ alkyl, or $C_{1-3}$ alkyl substituted by carboxy,
X is $C_{1-3}$ alkylene, $C_{1-3}$ alkylene substituted by COOH or $PO_3H_2$ groups, and
n is 0 or 1, and a corrosion inhibitor which is not a phosphonocarboxylic acid of said formula.

2. A liquid of claim 1, wherein the amount of glycol is 10–60% by weight of the total of glycol and water.

3. A liquid of claim 1 wherein the amount of phosphonocarboxylic acid is 0.005–0.2% by weight, based on the amount of glycol component.

4. A liquid of claim 3, wherein the amount of the phosphonocarboxylic acid is 0.01–0.06% by weight on the same basis.

5. A liquid of claim 1 or 3 wherein the phosphonocarboxylic acid is 2-phosphonobutane-1,2,4-tricarboxylic acid.

6. A method of cooling or of heat-transfer comprising circulating a liquid cooling or heat-transfer medium, wherein the liquid medium is that of claim 1.

7. A method of cooling or of heat-transfer comprising circulating a liquid cooling or heat-transfer medium, wherein the liquid medium is that of claim 2.

8. A method of inhibiting cavitation in a metal in contact with a nonfreezing, cooling and/or heat-transfer liquid comprising incorporating into the liquid a cavitation-inhibiting amount of at least one phosphonocarboxylic acid of the formula

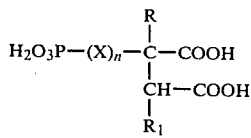

wherein
R is H, $C_{1-6}$ alkyl, $C_{1-6}$ alkyl substituted by carboxy,
$R_1$ is $C_{1-3}$ alkyl, or $C_{1-3}$ alkyl substituted by carboxy,
X is $C_{1-3}$ alkylene, $C_{1-3}$ alkylene substituted by COOH or $PO_3H_2$ groups, and
n is 0 or 1.

* * * * *